United States Patent [19]

Gandhi et al.

[11] 4,179,413

[45] Dec. 18, 1979

[54] ENRICHED RHODIUM CATALYST AND METHOD FOR MAKING SAME

[75] Inventors: Haren S. Gandhi, Farmington Hills; Mordecai Shelef, Birmingham; Paul P. Wynblatt, Southfield, all of Mich.

[73] Assignee: Ford Motor Company, Dearborn, Mich.

[21] Appl. No.: 15,573

[22] Filed: Feb. 26, 1979

Related U.S. Application Data

[63] Continuation-in-part of Ser. No. 775,809, Mar. 9, 1977, abandoned.

[51] Int. Cl.$^2$ .......................... B01J 23/42; B01J 23/46
[52] U.S. Cl. ................................ 252/472; 423/213.5; 423/239
[58] Field of Search ................. 252/472; 148/13, 13.1; 423/213.5, 239, 239 A

[56] References Cited

U.S. PATENT DOCUMENTS

| | | | |
|---|---|---|---|
| 3,840,471 | 10/1974 | Acres | 252/472 X |
| 3,951,860 | 4/1976 | Acres et al. | 252/462 X |
| 4,006,103 | 2/1977 | Meguerian et al. | 252/472 X |

Primary Examiner—W. J. Shine
Attorney, Agent, or Firm—William E. Johnson; Keith L. Zerschling

[57] ABSTRACT

The specification teaches a method of enriching a catalyst system in which both platinum and rhodium are present. The enrichment increases the amount of rhodium which is actively available for use as a catalyst. The enrichment is brought about by thermally aging the catalyst system in an oxidizing atmosphere by heating it to a temperature in a range from 650° C. to 875° C. for a period of at least two hours. A thermal aging at a temperature of about 800° C. for a period of 4 to 8 hours is preferred.

18 Claims, No Drawings

ENRICHED RHODIUM CATALYST AND METHOD FOR MAKING SAME

This application is a continuation-in-part of U.S. patent application Ser. No. 775,809 filed Mar. 9, 1977, now abandoned, entitled "Enriched Rhodium Catalyst and Method for Making Same."

BACKGROUND OF THE INVENTION

Rhodium can be an active metal component of catalyst systems used as either a reduction catalyst or a three way catalyst. Rhodium is used because of its known selectivity to oxidize carbon monoxide by nitrogen oxide in the presence of stoichiometricly balanced gas mixtures or slightly oxidizing gas mixtures. Under these conditions most base metal oxide catalyst and noble metal catalysts oxidize carbon monoxide preferentially by the oxygen available in the gas mixture and therefore do not treat the nitrogen oxides present.

The supply of rhodium in the world is generally limited by the mine ratio at which it occurs. Throughout the world, the general mine ratio of platinum to rhodium is about 17 to 1. In other words, for every 17 ounces of platinum obtained from a mine, 1 ounce of rhodium is obtained from that same mine during the process of extracting platinum. This ratio had been quoted in the recent past as 19.1 and still today the ratio of platinum to rhodium does vary from mine to mine. Therefore, in any large scale application of a three way catalyst to automotive exhaust gas emissions treatment which would contain rhodium, the rhodium content of the catalyst will be limited to its mine ratio because no one would discard the platinum mined with the rhodium. Also, if only rhodium was used as a catalyst, it soon would be depleted.

If rhodium is used in the ratio of platinum to rhodium of 17/1 on a three way catalyst, we have found that there is formation of ammonia when exhaust gas mixtures from an internal combustion engine which are overall reducing in composition are passed over the catalyst. This occurs because platinum has a poor selectivity for conversion of oxides of nitrogen to nitrogen. A large fraction of nitrogen oxides chemisorb which react on platinum are converted to ammonia instead of nitrogen.

Rhodium, on the other hand, is particularly selective for the reduction of oxides of nitrogen to nitrogen. Thus, if rhodium is made to be the principal catalyst material for conversion of oxides of nitrogen to nitrogen, less ammonia is produced.

It is the principal object of this invention to provide a catalyst system and method of making the same which produces a rhodium containing catalyst in which the amount of rhodium which is actively available for use as a catalyst is enriched over that which is available in the as manufactured catalyst system.

SUMMARY OF THE INVENTION

This invention is generally directed to the method of enriching a rhodium containing catalyst and, is particularly directed to a method of enriching a rhodium platinum containing catalyst which is to be used for the treatment of exhaust gases from an internal combustion engine.

In accordance with the teachings of the method of this invention, a catalyst system which includes at least platinum and rhodium as catalyst elements is enriched in the amount of rhodium which is actively available for use as a catalyst by a method of thermally aging the catalyst system. The catalyst system is thermally treated by heating it is an oxidizing atmosphere to a temperature in a range from 650° C. to 875° C. for a period of at least 2 hours. Preferably, the system is heated to a temperature in the range from 700° C. to 850° C. for a period of time from 2 to 8 hours. Our preferred treatment is in air and is at a temperature of about 800° C. for a time period of 4 to 8 hours.

This method produces a catalyst system in which utilization of the more costly and rare component rhodium is increased over that which is found if the system is left untreated. By increasing the activity of the rhodium catalyst, a particular beneficial result is achieved in the reduction of oxides of nitrogen found in an exhaust gas stream from an internal combustion engine. In this particular case, the amount of ammonia produced during reduction of the oxides of nitrogen by this system is reduced because of the enrichment of the rhodium.

In accordance with the broad teachings of our invention, a new catalyst system comprising platinum and rhodium in which the rhodium catalyst is enriched is prepared by the following steps. A substrate is obtained and at least platinum and rhodium are deposited thereon. The substrate and the materials deposited thereon are thermally treated by heating them in an oxidizing atmosphere to a temperature in a range from 650° C. to 875° C. for a period of at least 2 hours. The thermal aging can be carried out in a temperature range from 700° C. to 850° C. for a time period of 2 to 8 hours and is preferably carried out at a temperature of about 800° C. in air for a period of 4 to 8 hours. It is also preferred to deposit the platinum and rhodium on the substrate in a ratio in which these materials are obtained from a mining operation.

DESCRIPTION OF THE PREFERRED EMBODIMENT

This invention is directed to an enriched rhodium containing catalyst and method of making the same. The catalyst of this invention may be used in any type of catalytically assisted reaction wherein rhodium has beneficial properties as a catalyst. Such a catalyst operation may be exemplified by the use of rhodium as a catalyst for eliminating oxides of nitrogen from an exhaust gas stream from an internal combustion engine. In such a use, the rhodium is effective in eliminating oxides of nitrogen and produces little if any ammonia in such a reaction.

The enriched catalyst of this invention may be placed on any suitable substrate material. For example, monolithic substrates, pelletized substrates or metallic substrates may be used as the support for the catalyst. Also the catalyst may be placed on the substrate along with other catalyst materials for other specific purposes or with other components such as oxygen storage materials or protective materials.

In general, in making a rhodium containing catalyst for use as either an $NO_x$ or as a three way catalyst, rhodium and platinum are placed on the same substrate in a ratio of platinum to rhodium of about 17 to 1. The reason that this ratio is used is that this is the ratio in which the two materials are generally produced from a mine. In other words, during the production of 17 ounces of platinum from a mine, one ounce of rhodium is also produced. It is known that the ratio of platinum to rhodium can vary from mine to mine in a ratio of about 17:1 to about 19:1. Thus, in normal applications, a ratio of platinum to rhodium on a substrate is from about 17:1 to about 19 to 1. We have found that employing this ratio of rhodium to platinum in either a $NO_x$ or three way catalyst results in the production of more ammonia than would be produced if rhodium was present on the substrate by itself. We have by the method of this invention been able to take a substrate having platinum and rhodium thereon in the mine ratio and enrich the amount of rhodium which is actively available from the catalyst system for use as a catalyst. The enrichment can be to such an extent that it appears as if the ratio of platinum to rhodium on the substrate was in the range of 4:1 instead of greater than 16:1. By such enrichment, the amount of ammonia produced by the catalyst having in reality a mine ratio of platinum to rhodium is substantially reduced.

Briefly the method of this invention teaches a thermal treatment of the catalyst system in order to enrich the amount of rhodium which is actively available for use as a catalyst even though the actual bulk ratio of rhodium to platinum on the substrate remains the same. In effect the rhodium is brought to the surface of the catalyst by the thermally aging and thereby makes more of it available for the reduction reaction when the catalyst is used in treating exhaust gases from an internal combustion engine.

The catalyst system is thermally treated by heating it in an oxidizing atmosphere, such as air, to a temperature in the range from 650° C. to 875° C. The catalyst system is thermally treated for a period of at least 2 hours. In accordance with more detailed teachings of this invention, the temperature range employed is a temperature range from 700° C. to 850° C. and the period of time is from 2 to 8 hours, the longer period of time being used at the lower temperatures. A preferred method is that of thermally treating in air at a temperature of about 800° C. for a period of 4 to 8 hours.

After a rhodium platinum containing catalyst has been treated in accordance with the teachings of this invention, the working ratio of platinum to rhodium is decreased over the platinum to rhodium ratio actually present on the substrate. In other words, even though the platinum rhodium ratio on the substrate is 17:1, the catalyst behaves as if the ratio was much lower for example in the range of 4:1 to 8:1.

The thermal treating of the catalyst system must take place in an oxidizing atmosphere. By this we mean that the atmosphere must contain more oxidizing species than reducing species. It is also important that the temperature of 875° C. not be exceeded during the thermal treatment. We have found that if this temperature is exceeded, there is a sintering of the catalyst materials and a substantial decrease in their catalyst properties.

We have also found that the enrichment of the rhodium by thermal treatment is more effective for higher platinum to rhodium ratios. In other words, the treatment is more effective in treating a platinum to rhodium ratio in the range of 8:1 to 19:1, preferably 10:1 to 19:1, and most preferably 12:1 to 19:1 than in treatment of a platinum rhodium ratio catalyst system in which the ratio is in the range of 1:1 to 4:1. This particular aspect is demonstrated in Table I.

TABLE I

EFFECT OF THERMAL TREATMENT* ON $NH_3$ FORMATION REACTION OVER Pt/Rh CATALYSTS

| Catalyst | P.M. Loading (g/FT³) | $NH_3$, as % of NO Converted at | | | |
|---|---|---|---|---|---|
| | | R = 1.6 Fresh | Aged* | R = 2.2 Fresh | Aged* |
| PT/RH = 0.8 | 50 | 8 | 8 | 24 | 26 |
| PT/RH = 4.1 | 50 | 12 | 13 | 25 | 25.5 |
| PT/PH = 10.5 | 50 | 18 | 13 | 53 | 31 |
| PT/RH = 16.6 | 50 | 25 | 17 | 43 | 26 |

-R, as defined in Society of Automotive Engineers 1976 paper SAE 760,201, page 903, is the partial pressures of reducing species divided by partial pressures of oxidizing species.
*Thermal Treatment: 800° C. for 7 hours in air.

Experimental Conditions:
T = 550° C.
S.V. = 60,000 hour$^{-1}$

The above table illustrates that a platinum rhodium ratio of about 1 when thermally treated had little if any improvement in the amount of ammonia produced as a percentage of NO converted when the catalyst was used to treat exhaust gases from an internal combustion engine. The table also illustrates that there is a small improvement for platinum to rhodium ratios of about 4:1. The table does illustrate that there is a significant increase in the operability of rhodium that is subject to an enrichment when the catalyst had a platinum to rhodium ratio of a little over 8:1, for example at 10.5:1 and 16.6:1. In both cases, the thermally treated catalyst system produced less ammonia as a percentage of the NO converted than the fresh catalyst.

Additional direct evidence of surface enrichment is obtained when thermally treated Pt/Rh foil (Pt/Rh = 9) were examined under Auger Spectroscopy as per Table 2 below.

TABLE 2

Surface Composition of Pt-Rh Foils (Pt/Rh = 9), as Determined by Auger Electron Spectroscopy

| Thermal Treatment Temperature* | Auger Peak Ratio Rh(302eV)/Pt(64eV)+ | Approximate Surface Composition Rh/Pt |
|---|---|---|
| 750° C. | 30 | 13 |
| 800° C. | 43 | 19 |
| 850° C. | 13 | 5.7 |
| 900° C. | 3.2 | 1.4 |
| 950° C. | 1.8 | 0.8 |
| 1000° C. | 1.8 | 0.8 |

*Samples held 4 hours in air at each temperature
+Based on spectra obtained after light sputter to remove contamination.

There has been disclosed herein a catalyst system and method of manufacturing the same in which the availability of rhodium to act as an active catalyst is enriched. In view of the teachings of this specification, those skilled in the art will be able to make many modifications of the invention claimed herein. It is intended that all such modifications which fall within the true spirit and scope of this invention be included within the appended claims.

What we claim is:

1. A method for enriching the amount of rhodium which is actively available for use as a catalyst in a catalyst system which includes a substrate and at least platinum and rhodium as catalyst elements, said platinum and rhodium being in a ratio of about 8:1 to 19:1, which method comprises:

thermally treating the catalyst system by heating it in an oxidizing atmosphere to a temperature in the range from 650° C. to 875° C. for a period of at least two hours.

2. A method for enriching the amount of rhodium which is actively available for use as a catalyst in a catalyst system which includes a substrate and at least platinum and rhodium as catalyst elements, said platinum and rhodium being in a ratio of about 8:1 to 19:1, which method comprises:
thermally treating the catalyst system by heating it in an oxidizing atmosphere to a temperature in the range from 700° C. to 850° C. for a period of time from 2 to 8 hours, a longer heating period being used at lower temperatures.

3. A method for enriching the amount of rhodium which is actively available for use as a catalyst in a catalyst system which includes a substrate and at least platinum and rhodium as catalyst elements, said platinum and rhodium being in a ratio of about 8:1 to 19:1, which method comprises:
thermally treating the catalyst system by heating it in an oxidizing atmosphere to a temperature of about 800° C. for a time period from about 4 to 8 hours.

4. A catalyst system comprising platinum and rhodium in which the rhodium catalyst is enriched, said catalyst system being prepared by:
obtaining a substrate;
depositing at least platinum and rhodium on said substrate, said platinum and rhodium being in a ratio of about 8:1 to about 19:1;
thermally treating said substrate and materials deposited thereon by heating them in an oxidizing atmosphere to a temperature in the range from 650° C. to 875° C. for a period of at least 2 hours.

5. The catalyst system of claim 4 in which said platinum and rhodium are deposited on said substrate in the ratio they are obtained from a mining operation, which ratio ranges from about 17:1 to about 19:1.

6. A catalyst system comprising platinum and rhodium in which the rhodium is enriched, said catalyst system is prepared by:
obtaining a substrate;
depositing at least platinum and rhodium on said substrate, said platinum and rhodium being in a ratio of about 8:1 to about 19:1;
thermally treating said substrate and materials deposited thereon by heating them in an oxidizing atmosphere to a temperature in the range from 700° C. to 850° C. for a period of time from 2 to 8 hours, a longer time period being used at the lower temperature.

7. The catalyst system of claim 6 in which said platinum and rhodium are deposited on said substrate in the ratio they are obtained from a mining operation, which ratio ranges from about 17:1 to about 19:1.

8. A catalyst system comprising platinum and rhodium in which the rhodium catalyst is enriched, said catalyst system is prepared by:
obtaining a substrate;
depositing at least platinum and rhodium on said substrate, said platinum and rhodium being in a ratio of about 8:1 to about 19:1; and
thermally treating said substrate and materials deposited thereon by heating them in an oxidizing atmosphere to a temperature from about 800° C. for a period of time from about 4 to 8 hours.

9. The catalyst system of claim 8 in which said platinum and rhodium are deposited on said substrate in the ratio they are obtained from a mining operation, which ratio ranges from about 17:1 to about 19:1.

10. A method for enriching the amount of rhodium which is actively available for use as a catalyst in a catalyst system which includes a substrate and at least platinum and rhodium as catalyst elements, said platinum and rhodium being in a ratio of about 12:1 to 19:1, which method comprises:
thermally treating the catalyst system by heating it in an oxidizing atmosphere to a temperature in the range from 650° C. to 875° C. for a period of at least two hours.

11. A method for enriching the amount of rhodium which is actively available for use as a catalyst, in a catalyst system which includes a substrate and at least platinum and rhodium as catalyst elements, said platinum and rhodium being in a ratio of about 12:1 to 19:1, which method comprises:
thermally treating the catalyst system by heating it in an oxidizing atmosphere to a temperature in the range from 700° C. to 850° C. for a period of time from 2 to 8 hours, a longer heating period being used at lower temperatures.

12. A method for enriching the amount of rhodium which is actively available for use as a catalyst, in a catalyst system which includes a substrate and at least platinum and rhodium as catalyst elements, said platinum and rhodium being in a ratio of about 12:1 to 19:1, which method comprises:
thermally treating the catalyst system by heating it in an oxidizing atmosphere to a temperature of about 800° C. for a time period from about 4 to 8 hours.

13. A catalyst system comprising platinum and rhodium in which the rhodium catalyst is enriched, said catalyst system being prepared by:
obtaining a substrate;
depositing at least platinum and rhodium on said substrate, said platinum and rhodium being in a ratio of about 12:1 to about 19:1;
thermally treating said substrate and materials deposited thereon by heating them in an oxidizing atmosphere to a temperature in the range from 650° C. to 875° C. for a period of at least 2 hours.

14. The catalyst system of claim 13 in which said platinum and rhodium are deposited on said substrate in the ratio they are obtained from a mining operation, which ratio ranges from about 17:1 to about 19:1.

15. A catalyst system comprising platinum and rhodium in which the rhodium is enriched, said catalyst system is prepared by:
obtaining a substrate;
depositing at least platinum and rhodium on said substrate, said platinum and rhodium being in a ratio of about 12:1 to about 19:1; and
thermally treating said substrate and materials deposited thereon by heating them in an oxidizing atmosphere to a temperature in the range from 700° C. to 850° C. for a period of time from 2 to 8 hours, a longer time period being used at the lower temperature.

16. The catalyst system of claim 15 in which said platinum and rhodium are deposited on said substrate in the ratio they are obtained from a mining operation, which ratio ranges from about 17:1 to about 19:1.

17. A catalyst system comprising platinum and rhodium in which the rhodium catalyst is enriched, said catalyst system is prepared by:
obtaining a substrate;

depositing at least platinum and rhodium on said substrate, said platinum and rhodium being in a ratio of about 12:1 to about 19:1; and thermally treating said substrate and materials deposited thereon by heating them in an oxidizing atmosphere to a temperature from about 800° C. for a period of time from about 4 to 8 hours.

18. The catalyst system of claim 17 in which said platinum and rhodium are deposited on said substrate in the ratio they are obtained from a mining operation, which ratio ranges from about 17:1 to about 19:1.

* * * * *